3,197,508
PROCESS FOR PREPARING N,N-DISUBSTITUTED NITROXIDES

Arthur Kentaro Hoffmann, Stamford, and Allan Murry Feldman, Norwalk, Conn., assignors to American Cyanamid Company, Stamford, Conn., a corporation of Maine No Drawing. Filed Dec. 4, 1962, Ser. No. 242,078
4 Claims. (Cl. 260—576)

This invention relates to new chemical compounds and to a process for preparing the same. More particularly, this invention relates to N,N-disubstituted nitroxides and to a process for preparing these compounds. In a still more particular aspect, this invention relates to a process for preparing N,N-disubstituted nitroxides which may be either symmetrically or unsymetrically substituted.

In copending application Serial No. 129,560, filed August 7, 1961, a class of N,N-disubstituted nitroxides of the general formula $$R_2N-O$$

wherein R was a tertiary alkyl radical is therein described and claimed. These unique compounds are stable free radicals and as such are useful as polymerization inhibitors and as antioxidants. In addition, such N,N-disubstituted nitroxides are useful as traps for reactive free radicals and as paramagnetic standards for electron spin resonance spectrometry. The class of N,N-disubstituted nitroxides of application Serial No. 129,560 is prepared by a novel method also described and claimed in that application. This method involves treating a nitro or nitroso alkane with an alkali metal in an inert reaction medium and in the absence of an oxidizing atmosphere. While the method therein described is especially advantageous for the preparation of that class of N,N-disubstituted nitroxides, nevertheless, such method is possessed of very severe limitations. The principal disadvantage of such procedure is that N,N-disubstituted nitroxides containing functional groups which are sensitive to alkali metals may not be so prepared. An additional disadvantage is that the method does not readily lend itself to the preparation of N,N-disubstituted nitroxides in which substituents other than tertiary alkyl radicals are present on the nitrogen atom.

To a certain extent, such disadvantages are overcome by a method which is described and claimed in copending application Serial No. 202,051, filed June 13, 1962. The method of that application involves treating a tertiary nitroso compound with an azo compound so as to obtain N,N-disubstituted nitroxides which may contain substituents on one of the tertiary carbon atoms attached to the quadrivalent nitrogen atom. The N,N-disubstituted nitroxides so prepared, however, are similar to the nitroxides prepared by the method described and claimed in application Serial No. 129,560 in that in both classes of nitroxides two tertiary carbon atoms are attached to the quadrivalent nitrogen atom. The method of application Serial No. 202,051, however, is also limited in its applicability. Thus, N,N-diaryl nitroxides are not readily obtainable by such method. A further disadvantage resides in the obtaining of the starting nitroso and azo reactants.

It has now been discovered that N,N-disubstituted nitroxides of the formula

in which both R and R' are each tertiary alkyl, aryl or tertiary cycloalkyl radicals, which may be the same or different, may be readily prepared by a procedure which will be more fully described hereinafter.

In accordance with the present invention, it has been found that N,N-disubstituted nitroxides of the formula hereinabove may be readily and simply prepared by causing to react a nitro compound of the formula $$RNO_2$$

with a carbanion of the formula $$R'Z$$

in which R and R' are as defined hereinabove and further in which Z is selected from the group consisting of Na, Li, K, MgX in which X is selected from the group consisting of Cl, Br and I. The reaction takes place at a temperature of from about —100° C. to about 25° C. followed by aqueous hydrolysis of the adduct at a temperature of from about —50° C. to about 40° C. to yield the corresponding N,N-disubstituted nitroxide.

A principal feature of the present invention is that it permits the preparation of either symmetrical or unsymmetrical N,N-disubstituted nitroxides. In addition, it permits the preparation of nitroxides containing functional groups as substituents of the aryl grouping or tertiary cycloalkyl grouping.

In general, the R substituent of the N,N-disubstituted nitroxide as prepared by the process of the present invention may be derived from either the nitro compound, i.e., a tertiary carbinyl nitro compound, an aromatic nitro compound or a cycloaliphatic nitro compound containing no α-hydrogen atoms, or it may be derived from the carbanion, i.e., an organo sodium reactant, organo lithium reactant, organo potassium reactant or Grignard reagent. Similarly, the R' substituent may be derived from either the nitro compound or the carbanion. In most instances, the availability or ease of preparation of the nitro compound or carbanion will be determinative. Thus, depending upon the choice of reactants one may obtain symmetrical or unsymmetrical N,N-disubstituted nitroxides.

The process of the present invention wherein a nitro compound is reacted with a carbanion is usually accomplished in an inert reaction medium and in the absence of oxygen or moisture. While the use of an inert reaction medium is not absolutely essential, it is preferred that the reaction be conducted in such a medium which is a solvent and which is inert to the reactants. Typical solvents include monoethers such as dimethylether, diethylether, and the like, polyethers such as 1,2-dimethoxyethane, dimethylether of diethylene glycol, and the like and hydrocarbon solvents both aromatic, e.g., benzene, toluene, xylene, and the like, and paraffinic, e.g., hexane, heptane, and the like. Carrying out the process in the absence of oxygen or moisture is accomplished usually by providing an inert atmosphere such as nitrogen, helium, or the like over the contents of the reaction vessel.

Approximately one mole of carbanion for each mole of nitro compound is employed. A slight excess of either may be used, however, with no apparent adverse effects.

The temperatures employed in the process may be varied over a wide range. In general, however, temperatures of from about —100° C. to about 25° C. are employed with good success while temperatures of from about —50° C. to about 25° C. are preferred during the first step of the reaction. In such step, an adduct is formed from the reaction of the carbanion with the nitro compound. The structure of such adduct is believed to be

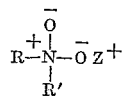

wherein R, R' and Z are as defined hereinabove. During the second step of the process, this adduct is then hydrolyzed with water at temperatures of from about −50° C. to about 40° C. During hydrolysis, the adduct is converted to the N,N,-disubstituted nitroxide which is then usually recovered from the inert reaction medium containing the same. Subsequent purification by conventional methods, for example, fractional crystallization and distillation, affords substantially pure N,N-disubstituted nitroxide.

Suitable tertiary carbinyl nitro compounds which may be employed in the process of this invention are included in the following non-limiting listing: 2-nitro-2-methyl butane, 2-nitro-2-methyl propane, 2-nitro-2,3-dimethyl butane, 2-nitro-2-methyl pentane, 2-nitro-2,4-dimethyl pentane, 2-nitro-2,4,4-trimethyl pentane, 2-nitro-2,5-dimethyl hexane, 2-nitro-2,6-dimethyl heptane, 3-nitro-3-ethyl pentane, 1-nitro-1-methyl cyclopentane, 1-nitro-1-methyl cyclohexane, 1-nitro-1,4-dimethyl cyclohexane, and the like; 2-nitro-2-phenyl propane, and the like. Higher tertiary nitroalkanes may be readily obtained by the procedure of Kornblum, Clutter and Jones, J. Am. Chem. Soc. 78, 4003 (1956). Suitable aromatic nitro compounds which may be employed in the process of this invention are included the following non-limiting listing: nitrobenzene, 1-nitronaphthalene, 2-nitronaphthalene, 2,6-dimethoxynitrobenezene, 2,6-dimethylnitrobenzene, o-nitrotoluene, p-nitrotoluene, nitromesitylene, 2,4,6-tri-t-butylnitrobenzene, 2,4,6-trimethoxybenzene, p-N,N-dimethylaminonitroaniline, and the like.

Suitable tertiary carbinyl or aromatic carbanions which may be represented by the formula

R'Z which may be employed in the process of this invention are included in the following non-limiting listing: α,α-dimethylbenzyl potassium, t-butyl lithium, t-butyl magnesium chloride, t-butyl magnesium bromide, t-butyl magnesium iodide, 1-methyl-cyclohexyl magnesium chloride, 1-methyl-1-1-cyclopentyl magnesium chloride, m-methoxy-α,α-dimethylbenzyl potassium, phenyl sodium, phenyl lithium, phenyl magnesium chloride, phenyl magnesium bromide, phenyl magnesium iodide, polyphenyl sodium, polyphenyl lithium and polyphenyl magnesium halides, that is, the biphenyl, terphenyl derivatives, etc., may be used. Similarly, the lithium and magnesium halide derivatives of fused aromatic systems, i.e., naphthalene, phenanthrene and anthracene, may also be utilized. Substituted phenyl, substituted polyphenyl, substituted naphthyl sodium and Grignard reagents may also be employed. Suitable substitution for aromatic carbanions derived from lithium and Grignard reagents include halo, such as chloro, bromo, fluoro and iodo; alkyl such as methyl, ethyl, propyl, etc.; alkoxy such as methoxy, ethoxy, propoxy, etc.; dialkyl amino such as dimethyl amino, diethyl amino and dibenzyl amino; perfluoroalkyl such as trifluoromethyl; substituted silyl such as trimethyl silyl, tribenzyl silyl, etc.

Suitable methods of preparation for such organo sodium, lithium and potassium compounds are reviewed in Alkali Metal Dispersions, Irving Fatt and Marie Tashima, Princeton, New Jersey, Van Nostrand, pages 161–173 (1961), and also in Annotated Bibliography on Use of Organo Lithium Compounds in Organic Synthesis, Lithium Corporation of America, Minneapolis, Minnesota (1949). See also, Supplements 1–9.

Grignard reagents are readily prepared by conventional methods.

In order to illustrate the present invention, the following examples are given.

EXAMPLE 1

*Tert-butylphenyl nitroxide*

To a toluene solution of 0.5 mole phenyl sodium is added tert-nitrobutane (50 gm., 0.49 mole). The reaction and all subsequent operations are performed under an atmosphere of nitrogen. The temperature is maintained at 0–5° C. by means of a solid $CO_2$—$CCl_4$ bath. After warming up overnight, a 10 cc. aliquot is removed and centrifuged to remove a dark precipitate. The suspension of white solid and red liquid is transferred to another centrifuge tube and again centrifuged. The white solid is separated, washed several times with cyclohexane and pumped dry. It has only a small esr spectrum and is therefore diamagnetic, the signal being attributed to a slight decomposition to nitroxide. Its infrared spectrum is vary similar to that of the solid from sodium and tert-nitrobutane in the 900–1100 cm.$^{-1}$ region. Its structure is believed to be

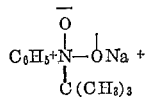

When added to water, the solid decomposes giving tert-butylphenyl nitroxide showing an esr spectrum consisting of an equally spaced equal intensity triplet with a hyperfine coupling constant of 12.7 gauss. Tert-butylphenyl nitroxide is a red, unstable liquid which shows 75% of the magnetic susceptibility expected for a product containing 100% free radicals. Alternatively, the total reaction mixture can be hydrolized with water to give, after separation of the organic phase followed by evaporative distillation of solvent at room temperature, crude tert-butylphenyl nitroxide together with smaller amount of N,N-tert-butylphenyl hydroxylamine.

EXAMPLE 2

*Tert-butylphenyl nitroxide*

An ether solution of phenyl lithium is prepared as in Organic Reactions, John Wiley and Sons, New York, vol. VIII, p. 286, on 0.5 mole scale. To the phenyl lithium solution cooled in a Dry-Ice acetone bath to −70° C. is added a solution of 50 g. (0.5 mole) tert-nitrobutane in an equal volume of ether. The reaction of nitro compound is vigorously exothermic. After it had all been added, the solution is allowed to warm slowly to room temperature and stand for 72 hours. At the end of this time, the reaction mixture is hydrolyzed with water. The ether layer is separated, dried and evaporatively distilled. Examination of the residue by esr established the presence of tert-butylphenyl nitroxide while magnetic susceptibility measurements indicated that it was present to the extent of 15%.

EXAMPLE 3

*4-chlorodiphenyl nitroxide*

The procedure of Example 2 is repeated in all essential respects except that p-chlorophenyl lithium is used in place of phenyl lithium and nitrobenzene is used in place of t-nitrobutane. 4-chlorodiphenyl nitroxide is obtained having properties similar to dipheny nitroxide.

EXAMPLE 4

*4-N,N-dimethylaminophenyl-t-butyl nitroxide*

The procedure of Example 2 is repeated in all essential respects except that p-N,N-dimethylaminophenyl lithium is used in place of phenyl lithium. The product, 4-N,N-dimethylaminophenyl-t-butyl nitroxide is obtained.

EXAMPLE 5

*Di-tert-butyl nitroxide*

An ether solution of tert-butyl lithium was prepared by the procedure of P. D. Bartlett and E. B. Lefferts, J. Am. Chem. Soc., 77, 2804 (1955), starting with 46.5 g. (0.5 mole) of tert-butyl chloride and 7 g. (1 mole) of lithium metal. To the lithium reagent was added 50 g. of tert-nitrobutane at such a rate that the temperature was maintained at −30° C. to −40° C. After addition is complete, the reaction mixture is stirred at −30° C. for two hours and allowed to warm slowly to room temperature. After standing at ambient temperature for sixteen hours the reaction mixture is hydrolyzed with water and the ether solution withdrawn and dried and removed by evaporative distillation. The residue is fractionally distilled to give substantially pure di-tert-butyl nitroxide.

EXAMPLE 6

*Di-tert-butyl nitroxide*

The procedure of Example 3 is repeated in all essential respects except that tert-butyl magnesium chloride is used instead of tert-butyl lithium. Di-tert-butyl nitroxide is obtained in low yield.

EXAMPLE 7

*Bis-(2,6-dimethoxyphenyl) nitroxide*

A solution of 0.3 mole of phenyl lithium in 300 ml. diethyl ether is allowed to stand for 3 days with 41.4 g. (0.3 mole) of m-dimethoxybenzene in order to prepare the 1-lithio derivative. To the 1-lithio-2,6-dimethoxybenzene prepared in this manner is added 50 g. (0.273 mole) of a slurry of 2,6-dimethoxynitrobenzene prepared by the method of A. Baeyer, Ann., 372, 126, in 600 ml. of 1:1 ether benzene. The reaction mixture is stirred and cooled in an ice bath during the addition of the nitro compound. After addition is completed, the reaction mixture is allowed to warm to room temperature and stand for 15 hours. The supernatant solvents are removed by filtration through a fritted filter stick and the residual solid washed once with a 200 ml. portion of ether. The solid, covered with 200 ml. of fresh ether is hydrolyzed with 200 ml. of water and filtered from the aqueous layer and ether. The solid is washed with a small portion of cold acetone, then extracted with hot acetone until colorless. The acetone extracts deposited, on concentration, 4.3 g. of crude bis-(2,6-dimethoxyphenyl) nitroxide, crystallizing in red plates. An additional crystallization from methanol gives 3.5 g. of product (4.2%) analytically pure, M.P.: 199–200° C., decomposition.

*Analysis.*—Calculated for $C_{16}H_{13}NO_5$: C, 63.15; H, 5.96; N, 4.60. Found: C, 63.42; H, 6.10; N, 4.39.

Magnetic susceptibility, found: 1.78±.04 B.M., theory: 1.73.

EXAMPLE 8

*N,N-2,6-dimethoxyphenyl-t-butyl nitroxide*

To a slurry of 0.38 mole 2,6-dimethoxyphenyl lithium (Organic Reactions, John Wiley & Sons, N.Y., vol. VIII, p. 288) in ether is added 41.5 g. (0.4 mole) t-nitrobutane at 0° C. over the course of 15 minutes. The reaction mixture is allowed to warm slowly to room temperature whereupon a gentle exotherm sets in with reflux of the ether solvent. Stirring is continued for seven hours prior to hydrolysis. At the end of this time, the reaction mixture is hydrolyzed with 200 ml. water and the organic layer separated. Evaporative distillation of the ether leaves an oily residue which partially crystallizes on standing. The crystalline solid after filtration and recrystallization from cyclohexane is pure, colorless N,N-2,6-dimethoxyphenyl-t-butyl hydroxylamine, M.P. 125–126° C.

*Analysis.*—Calculated for $C_{12}H_{19}O_3N$: C, 63.97; H, 8.50; N, 6.22. Found: C, 63.86, 63.89; H, 8.06, 8.11; N, 6.36.

The oily fraction from the above reaction mixture after separation of the hydroxylamine subjected to molecular distillation is 80–90°/0.1 mm. Hg to remove recovered 2,6-dimethoxybenzene. The distillation residue crystallized to give substantially pure 2,6-dimethoxyphenyl-t-butyl nitroxide, M.P. 101–102.5° C. having an effective magnetic moment of 1.84 B.M.

*Analysis.*—Calculated for $C_{12}H_{18}O_3N$: C, 64.26; H, 809; N, 6.23. Found: C, 64.24; H, 8.05; N, 6.41.

EXAMPLE 9

*α,α-Dimethylbenzyl-α,α-p-trimethylbenzyl nitroxide*

To a surry of 0.2 mole of cumyl potassium in 300 ml. heptane is added 36 g. (0.2 mole) of nitro-2-(p-tolyl)propane dissolved in an equal volume of heptane at −10° C. to 0° C. The reaction mixture is stirred slowly for twelve hours and hydrolyzed with 300 ml. of water. The organic layer shows a strong esr spectrum consisting of an equally spaced equal intensity triplet with a hyperfine coupling constant of 14.9 gauss.

While the foregoing invention has been described in conjunction with various preferred embodiments, it is to be understood that the invention is not to be solely limited thereto but is to be constructed broadly and restricted only by the following appended claims.

We claim:

1. A process for preparing a nitroxide of the formula

in which R and R' are each selected from the group consisting of tertiary alkyl, tertiary cycloalkyl, phenyl, polyphenyl, naphthyl, phenanthryl, anthracyl, substituted phenyl, substituted polyphenyl, and substituted naphthyl, said substituents being selected from the group consisting of halo, alkyl, alkoxy, dialkylamino, dibenzylamino, perfluoroalkyl, trimethyl silyl and tribenzyl silyl, which comprises forming an adduct by reacting $RNO_2$ with $R'Z$ in which R and R' are as defined hereinabove and Z is selected from the group consisting of Na, Li, K and MgX wherein X is halogen, and subsequently hydrolyzing said adduct.

2. A process for preparing a nitroxide of the formula

in which R is tertiary alkyl and R' is aryl selected from the group consisting of phenyl, polyphenyl, naphthyl, phenanthryl, anthracyl, substituted phenyl, substituted polyphenyl, and substituted naphthyl, said substituents being selected from the group consisting of halo, alkyl, alkoxy, dialkylamino, dibenzylamino, perfluoroalkyl, trimethyl silyl and tribenzyl silyl, which comprises forming an adduct by reacting $RNO_2$ with $R'Z$ in which R and R' are as defined hereinabove and Z is selected from the group consisting of Na, Li, K and MgX wherein X is halogen, and subsequently hydrolyzing said adduct.

3. A process for preparing a nitroxide of the formula

in which R and R' are each tertiary alkyl, which comprises forming an adduct by reacting $RNO_2$ with $R'Z$ in which R and R' are as defined hereinabove and Z is selected from the group consisting of Na, Li, K and MgX wherein X is halogen, and subsequently hydrolyzing said adduct.

4. A process for preparing a nitroxide of the formula

in which R and R' are each aryl selected from the group consisting of phenyl, polyphenyl, naphthyl, phenanthryl, anthracyl, substituted phenyl, substituted polyphenyl, and substituted naphthyl, said substituents being selected from the group consisting of halo, alkyl, alkoxy, dialkylamino, dibenzylamino, perfluoroalkyl, trimethyl silyl and tribenzyl silyl, which comprises forming an adduct by reacting $$RNO_2 \text{ with } R'Z$$

in which R and R' are as defined hereinabove and Z is selected from the group consisting of Na, Li, K and MgX wherein X is halogen, and subsequently hydrolyzing said adduct.

References Cited in the file of this patent

Hoffmann et al.: "Jour. Amer. Chem. Soc.," vol. 83, pages 4671–72 (1961).

Hoffmann et al.: "Jour. Amer. Chem. Soc.," vol. 83, pages 4675–76 (1961).

CHARLES B. PARKER, *Primary Examiner*.

UNITED STATES PATENT OFFICE
CERTIFICATE OF CORRECTION

Patent No. 3,197,508                                          July 27, 1965

Arthur Kentaro Hoffmann et al.

It is hereby certified that error appears in the above numbered patent requiring correction and that the said Letters Patent should read as corrected below.

Column 3, line 40, for "1-methyl-1-1-cyclopentyl" read -- 1-methyl-1-cyclopentyl --; column 4, line 12, for "vary" read -- very --; lines 16 to 19, the formula should appear as shown below instead of as in the patent:

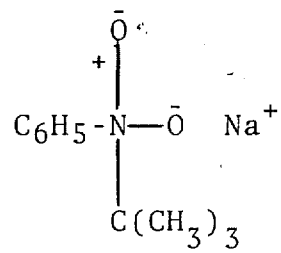

column 4, line 58, for "dipheny" read -- diphenyl --.

Signed and sealed this 15th day of February 1966.

(SEAL)
Attest:

ERNEST W. SWIDER                                EDWARD J. BRENNER
Attesting Officer                              Commissioner of Patents